United States Patent
Crespo

(10) Patent No.: US 6,687,369 B1
(45) Date of Patent: Feb. 3, 2004

(54) TELEPHONE SIGNAL DISCRIMINATOR

(76) Inventor: Jorge A. Crespo, 10441 SW. 46 St., Miami, FL (US) 33165

( * ) Notice: Subject to any disclaimer, the term of this patent is extended or adjusted under 35 U.S.C. 154(b) by 0 days.

(21) Appl. No.: 09/302,791

(22) Filed: Apr. 30, 1999

(51) Int. Cl.$^7$ ................................................ H04M 1/00
(52) U.S. Cl. .................................. 379/373.02; 379/418
(58) Field of Search ................................. 379/177, 179, 379/372, 207.16, 184, 373.02, 373.03, 373.05, 418, 902

(56) References Cited

U.S. PATENT DOCUMENTS

| | | | | |
|---|---|---|---|---|
| 4,219,700 A | * | 8/1980 | Panizzon et al. | 379/184 |
| 4,536,619 A | * | 8/1985 | Hamatani et al. | 379/372 |
| 4,782,518 A | * | 11/1988 | Mattley et al. | 379/207.16 |
| 5,142,569 A | * | 8/1992 | Peters et al. | 379/207.16 |
| 5,327,493 A | * | 7/1994 | Richmond et al. | 379/372 |
| 5,537,657 A | * | 7/1996 | King, III | 379/179 |

* cited by examiner

Primary Examiner—Minsun Oh Harvey
Assistant Examiner—Jefferey Harold
(74) Attorney, Agent, or Firm—J. Sanchelima

(57) ABSTRACT

A telephone signal discriminator to be used with one pair of telephone wires and a telephone company with coded ring services. The invention detects the interruptions of the ring signals, shapes them into square waveforms and initially sets off two timer circuits for enabling a shift register or counter for a first predetermined time period. A subsequent second time period is renewed with each set of coded ring signals. The result in the shift register or counter is advance a state in the outputs for each ring. The negated output ending with a low state is presented to the corresponding AND gate, that passes the low state through a corresponding OR gate. The OR gates have one of two inputs commonly connected so that they are disabled during the first period of time. In this manner, only one switch will permit the connection to a telephone outlet connection where one or more telephone devices are connected while the other telephone outlet connections are disabled.

6 Claims, 5 Drawing Sheets

TELEPHONE SIGNAL DISCRIMINATOR

BACKGROUND OF THE INVENTION

1. Field of the Invention

The present invention relates to a device for discriminating two or more telephone signals from a pair of telephone wires making the process invisible to the user, and more particularly, to a device that includes timing circuitry to mute out the call for a predetermined period of time until the coded call is identified and forwarded to the intended telephone set or sets with a unique number.

2. Description of the Related Art

The conventional telephone line utilizes one pair of wires carrying a D.C. voltage that is modulated when voice/sound is transmitted. The ring signal is an alternating signal superimposed on the D.C. voltage. Some telephone companies provide a service wherein the ring signal is coded and depending on the number of rings, one, two, three (or even more), distinctive sounds are generated. In this manner, a user can determine which of his two (or three or more) numbers is being called even though only one pair of wires is being used. The problem is that the user is required to make this determination and electronic devices, such as fax machines, are typically not equipped to do this. Also, visitors to the household, the elderly, or others with similar limitations, may find it difficult to determine which line is being called.

The present invention provides a simple reliable device to discriminate the incoming calls directing them to the intended set muting out the others. Thus, the result is that the discrimination process is invisible to a user and simulates the existence of additional independent lines.

SUMMARY OF THE INVENTION

It is one of the main objects of the present invention to provide a device that operates with one pair of telephone wires with coded ring signals to discriminate between two or more incoming calls and activates only predetermined telephone sets, faxes or other similar devices.

It is another object of this invention to provide a telephone signal discriminator that utilizes minimal electric power from the telephone network.

It is still another object of the present invention to provide a device that permits a user to operate a telephone line with a pair of wires as if more pairs of wires were present.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
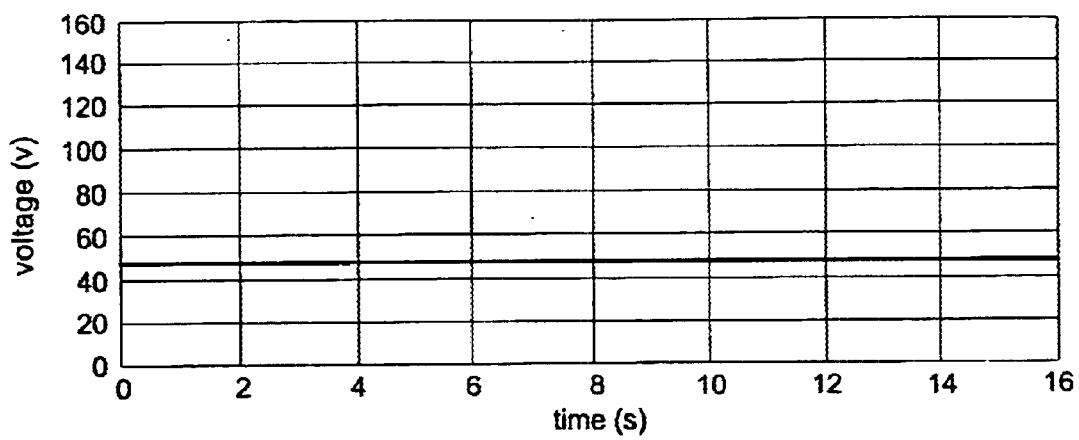
FIG. 1 represents the D.C. voltage normally present between the two wires of a conventional pair of telephone wires when at rest.
Figure 2:
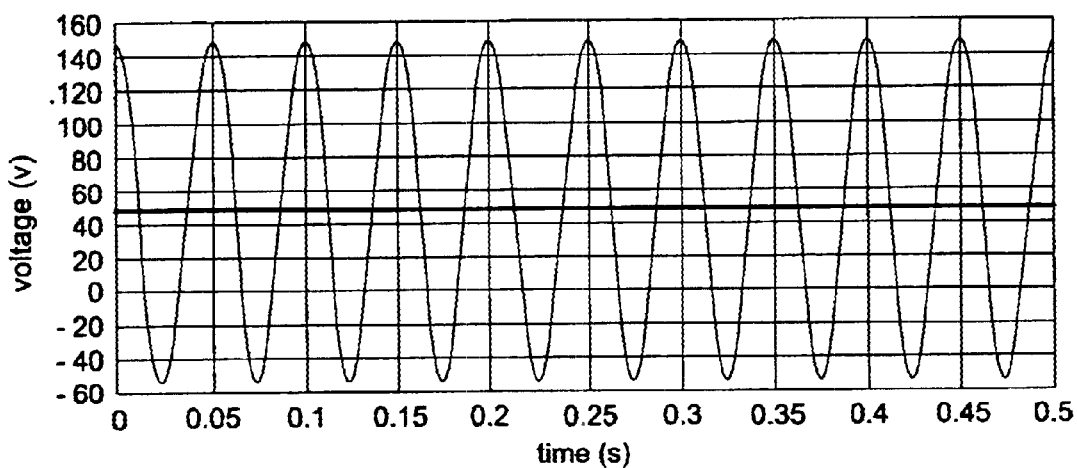
FIG. 2 shows the D.C. voltage represented in the previous figure with a superimposed ring signal.
Figure 3:
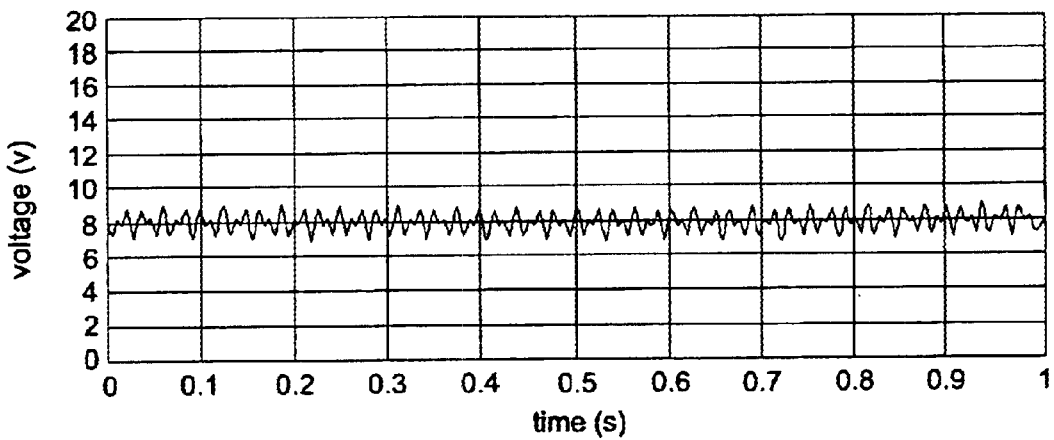
FIG. 3 shows an audio signal modulating a lower D.C. voltage (lower than the D.C. voltage present when the telephone sets are on the hook) as it is typically the case in most telephone networks.
Figure 4A:
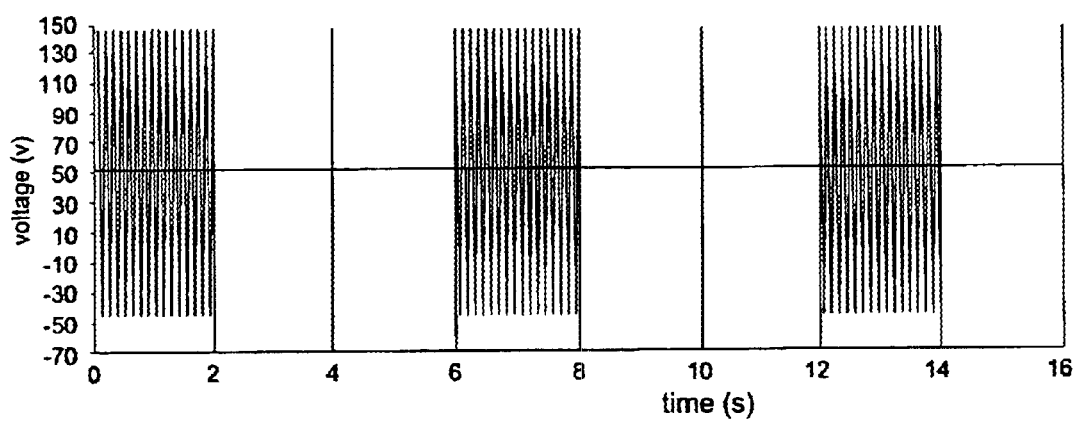
FIGS. 4a; 4b and 4c show typical signals generated by a telephone utility company when the service is provided to a user.
Figure 4B:
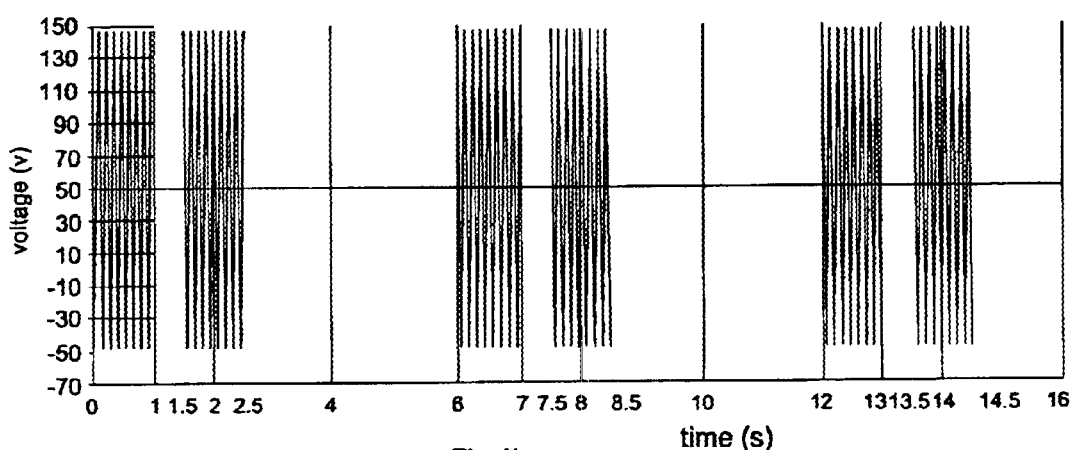
FIG. 4d is a time chart showing the duration of three distinct ring signals and the different outputs.
Figure 4C:
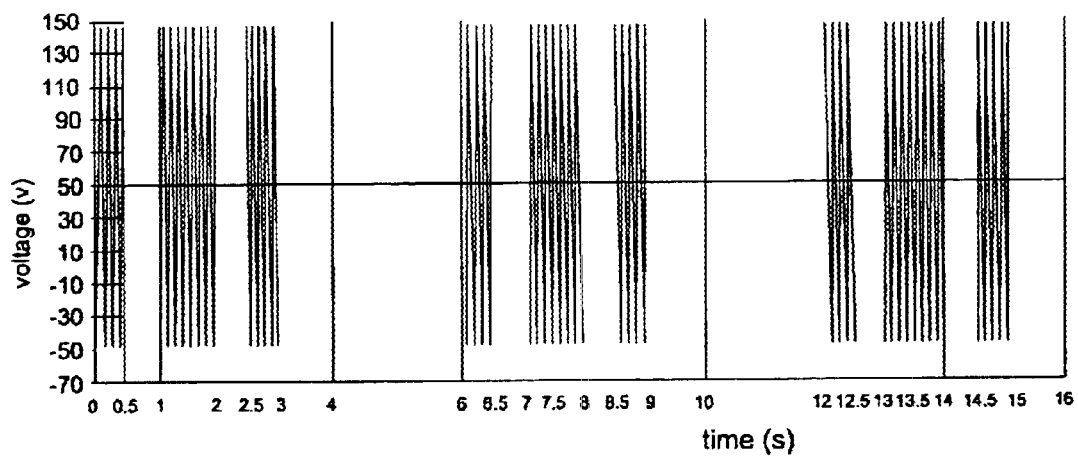

In most telephone networks, a D.C. (direct current) voltage in the 50 volts. neighborhood is provided when the telephones are on the hook, as represented in FIG. 1. When a ring signal is transmitted, a sinosoidal waveform is superimposed on the D.C. level of the previous figure resulting in what is shown in FIG. 2. Finally, when a user picks up the telephone, the D.C. voltage level is dropped and the lower D.C. voltage is modulated with the audio signal, as shown in FIG. 3. Some telephone companies have recently introduced distinctive sounds in their services allowing a subscriber to receive calls directed to more than one number over the same pair of wires. The subscriber, or user, is capable of distinguishing the tones and determine whether the call is intended for him or her. Devices like fax machines cannot typically distinguish these different ring signals. FIGS. 4a; 4b and 4c show typical signals generated by a telephone utility company when the service with three distinctive ring signals is provided to a user. The present application describes one of the preferred embodiments for these three signals but more or less distinctive ring signals can also be used with the pertinent modifications.

Figure 4D:
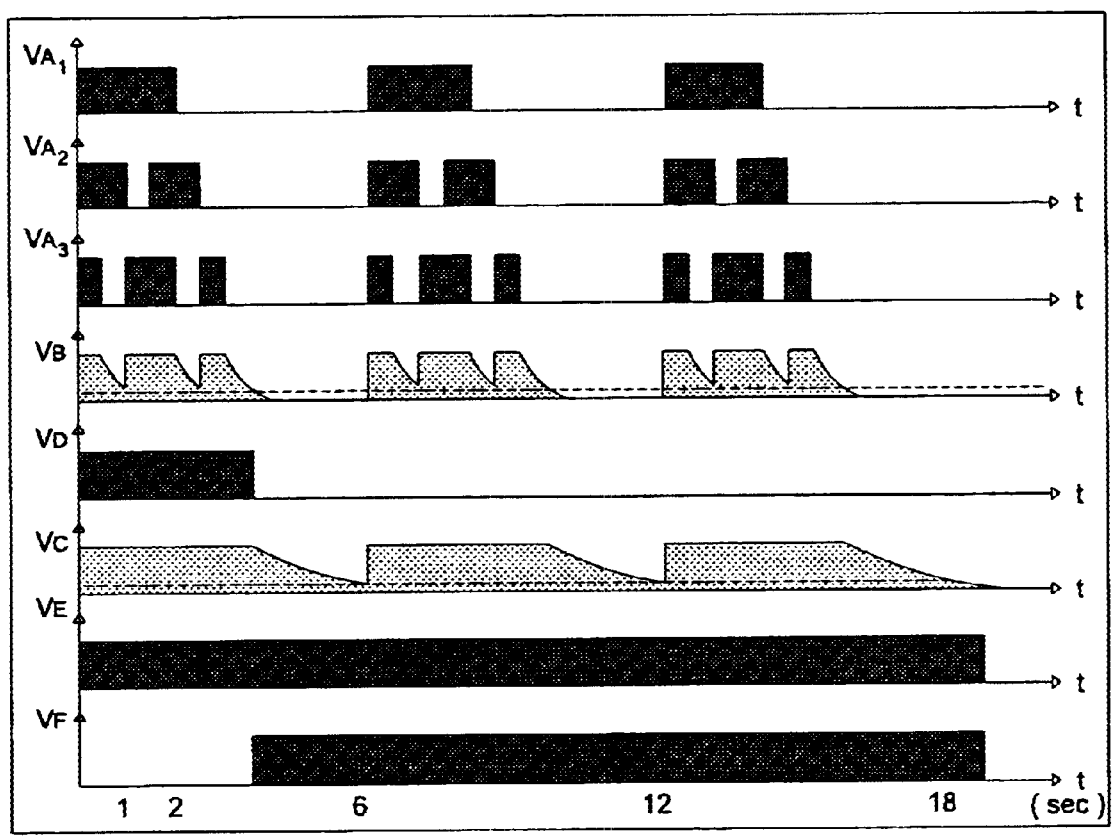
Figure 5:
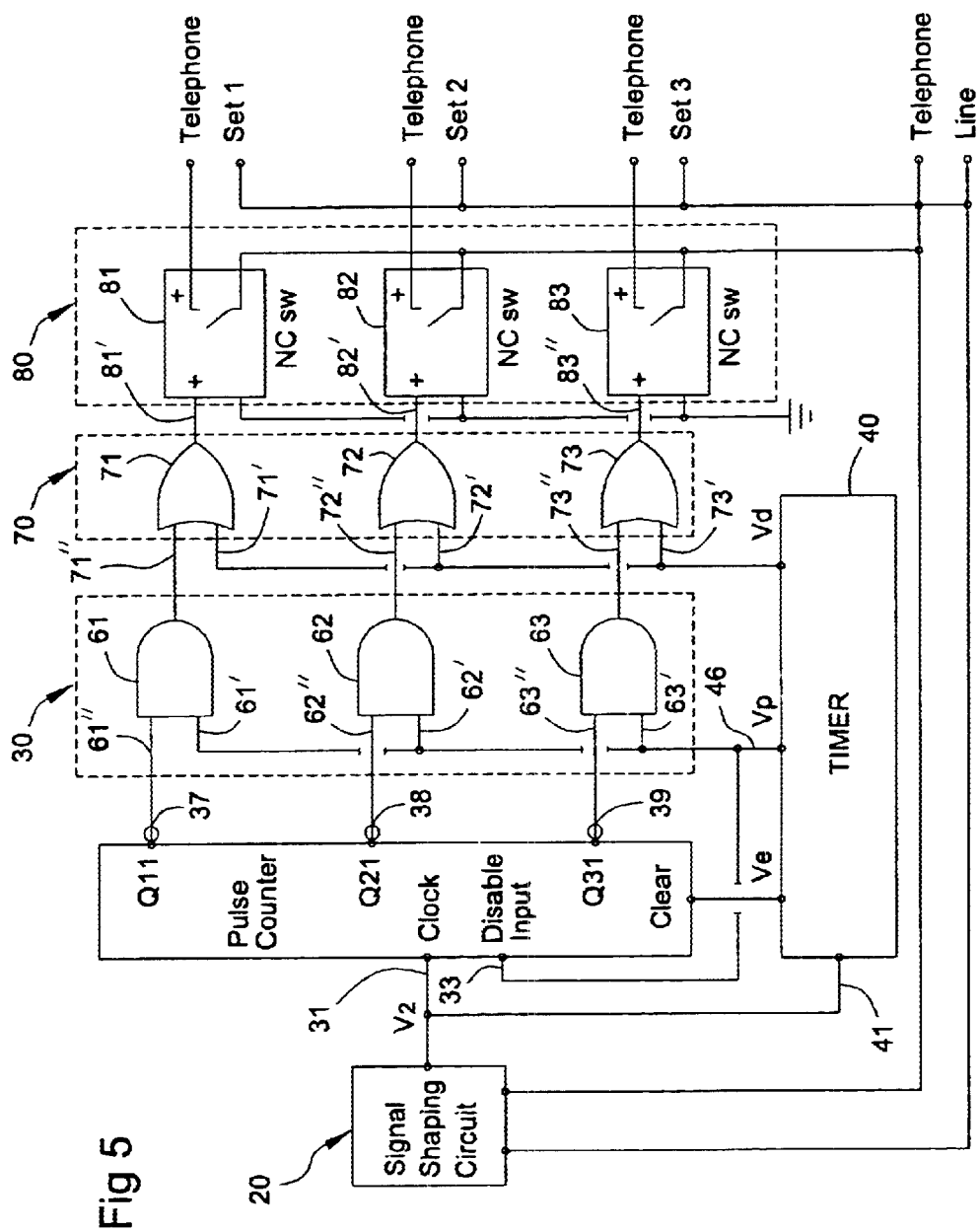
FIG. 5 represents a simplified block diagram of present invention.

Referring now to FIG. 5, where the present invention is generally referred to with numeral 10 in a block diagram, it can be observed that it basically includes pulse shaping circuit 20 connected to the ring wire of a telephone pair which in turn produces outputs of substantially square (digital) signals (as shown in FIG. 4d, timing chart for VA1) that are transmitted to pulse counter 30 and timer circuit 40. Pulse counter 30 can be implemented with flip flop 32 such as Dual-In-Line Package, part No. CD40175B manufactured by National Semiconductor Corp., and gate circuits as shown within the broken lines in FIG. 6. Pulse counter 30 has three inverse outputs 37; 38 and 39 that are connected individually to three inputs in AND gate circuit 60. AND gate circuit 60 can be implemented with an integrated circuit such as the one marketed by National Semiconductor, Corp. under part No. CD4081BC. Circuit 60 includes three outputs that are connected to switch circuit 80 through OR gate circuit 70. In this embodiment, three switches that are normally closed interrupt the telephone line connection to the respective three telephone sets when a logical "1" is applied to inputs 81'; 82' or 83'. Timer circuit 40 is triggered by the rising of the output from circuit 20 connected to input 41 and produces an enable output 46 that is transmitted to input 33 of pulse counter 30, thus enabling the latter to accept toggling inputs at 31 for a predetermined period of time $T_1$, shown in time charts VD and VF in FIG. 4d. This period of time $T_1$ is slightly longer tan the longest time required for any of the coded (distinctive) ring signals shown in FIG. 4d as time charts VA1, VA2 and VA3. During $T_1$ shift register 30 accepts and shifts the falling edges of the square waveform delivered by circuit 20 while the CLEAR input is high as shown in chart $V_E$.

Chart $V_B$ in FIG. 4d shows the time delayed waveforms generated when the coded (distinctive) ring signal corresponds to the three-pulse signal shown in time chart $V_{A3}$. Timing circuit 40 generates waveform $V_D$ from the initial presence of ring signal $V_{A3}$, in this illustration, presenting a high at the inputs 71', 72' and 73' of OR gate elements 71; 72 and 73 which in turn force a high on their respective outputs. These high outputs are then presented to the inputs of switches 81; 82 and 83 which force them to open the telephone sets (or any other devices) making them inoperational for an initial time period $T_1$.

During $T_1$, pulses $V_{A3}$ are present at input 31 and waveform $V_E$ maintains the count in flip flop 32 until its falling edge resets the outputs. At the end of $T_1$ the outputs (three outputs are used in the preferred embodiment described here for three distinctive coded ring signals) have a high on one of the three outputs, depending on the number of pulses counted. In this embodiment, the outputs used are the negative outputs, so a low will be present on the particular output that represents three pulses counted.

After $T_1$, signal $V_D$ goes low permitting the outputs of OR gate elements 71"; 72" and 73" are connected, respectively, to the outputs of AND gate elements 61, 62 and 63. Since signal $V_F$ goes high at the end of time period $T_1$, inputs 61', 62' and 63', the outputs of the AND gates will be determined by what is present at inputs 61", 62" and 63", which in turn are connected to the outputs 37, 38 and 39 of flip flop 32. Only one of the outputs of flip flop 32 will be low and the others will be high. In this case, output 39 (which is a negated output) represents the count of three. Therefore, input it 63" will be a low, making the output of AND gate element 63 a low which will be transmitted to the output of OR gate element 73 cause switch 83 to stay closed. The other switches, 81 and 82 will be open because a high will be present at their inputs and these highs can be traced to the negated outputs 37 and 38 of flip flop 32.

Telephone set 3, in this illustration, will receive the second set of ring pulses (three) since the first set was muted out for counting purposes. The waveform shown in chart $V_C$ of FIG. 4d continues until a user (or machine) pick up telephone set No. 3.

Figure 6:
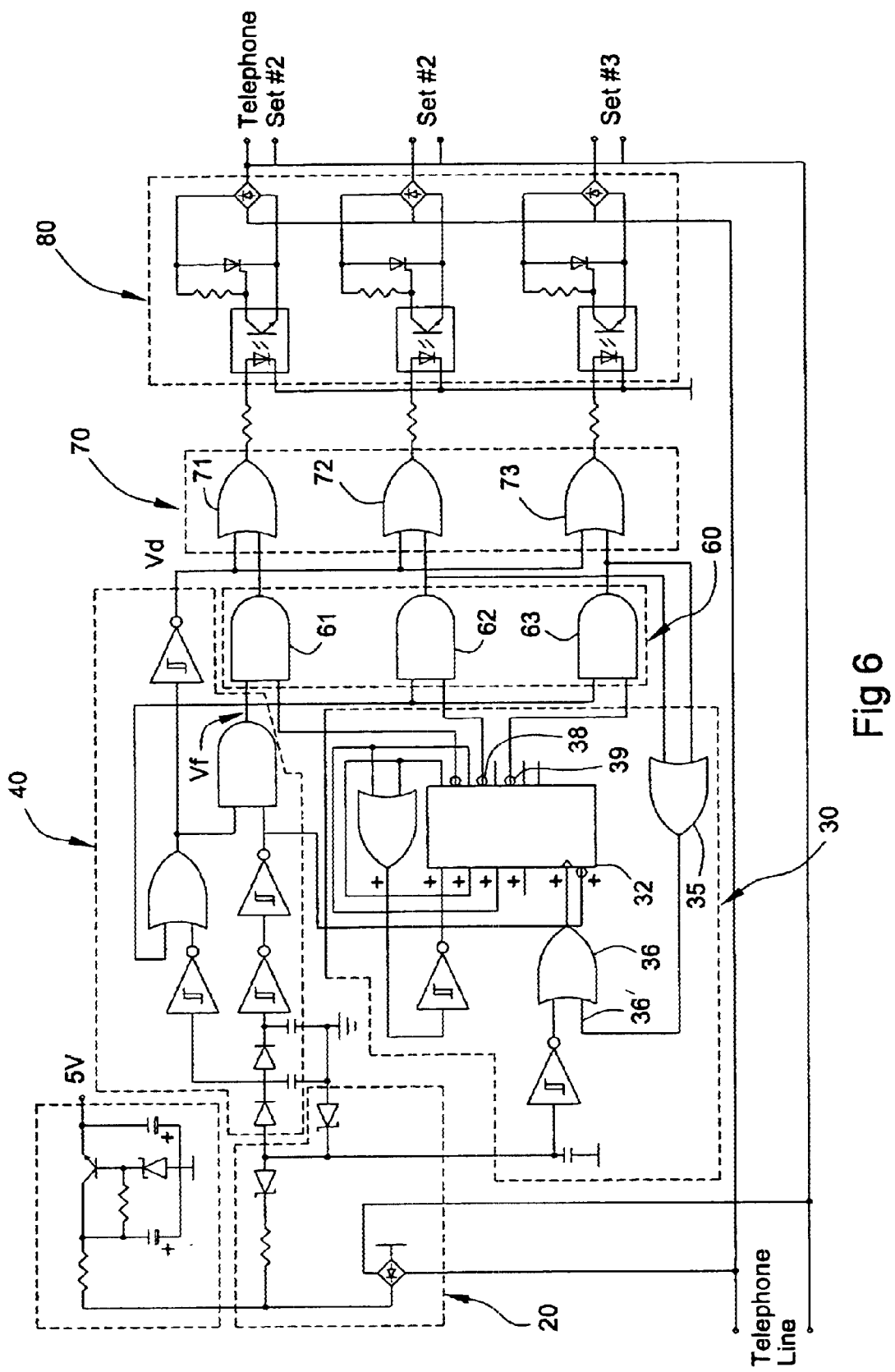
FIG. 6 shows a more detailed diagram showing one of the preferred embodiments for the present invention.

Since there will always be only one of the AND gate outputs in low state while the other two are high, OR gate 35 is used, as seen in FIG. 6, to disable the inputs to flip flop 32 since a high or either one of the inputs of OR gate 35 will produce a high at its output which is transmitted to input 36' of OR gate 36 forcing a high output connected to the clock of flip flop 32, thus preventing any further counting.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A discriminator device for telephone signals transmitted over a network pair of wires that include at least two coded ring signals with predetermined duration and at least one interruption, comprising:

A) means for shaping said coded ring signals into square wave-forms further including a first output and a first input, the latter being connected to a network pair of wires;

B) first timer means having a second input connected to said first output and said first timer means including a second output that is kept at a predetermined state for a first period of time that is slightly larger than the predetermined duration of a coded ring signal;

C) second timer means having a third input connected to said first output, and said second timer means including a third output that is kept at a predetermined state for a second period of time that starts after said first period of time;

D) means for detecting the number of interruptions of said coded ring signals over said first period of time and said detecting means including counting means having counting inputs enabled by said second output for said first period of time and said counting means including at least two counting outputs;

E) at least two first gate means for said counting outputs, respectively, including corresponding first gate means outputs for each of said counting outputs;

F) at least two second gate means for allowing said first gate means outputs through during said second time period, and further including a second gate means output for each of said first gate means outputs;

G) at least two switch means for interrupting the connection to a plurality of telephone outlet connections to a pair of wires and said switch means being connected to said second gate means outputs so that all of said switch means are disconnected during said first period of time and only one of said telephone connections is made during said second period of time and corresponding to a predetermined number of interruptions.

2. The device set forth in claim 1 wherein said first gate means includes at least two AND gate circuits, for transmitting said counting output during said second period of time to said first gate means outputs and said second gate means includes OR gate circuits for causing said switch means to interrupt the connection of said telephone outlet connections during said first period of time and to permit said first gate means outputs to go through to said switch means during said second period of time so that all of said telephone outlet connections are interrupted except one or more selected telephone outlet connections.

3. The device set forth in claim 2 further including:

H) means for disabling said counting means after said first period of time.

4. The device set forth in claim 3 wherein said means for disabling said counting means includes third gate means having at least two third gate means inputs connected to at least two of said first gate means outputs when there are at least three coded ring signals.

5. The device set forth in claim 4 wherein said counting means includes one output for each of said coded ring signal.

6. The device set forth in claim 3 further including:

I) means for transforming the voltage present in a telephone pair of wires to supply said device with compatible voltages.

* * * * *